March 20, 1962   O. K. KELLEY   3,025,720
HYDRODYNAMIC TORQUE CONVERTERS
Original Filed Oct. 31, 1952   3 Sheets-Sheet 2

Inventor
Oliver K. Kelley
By Willits, Helwig & Baillio
Attorneys

INVENTOR.
Oliver K. Kelley
BY
Willets, Helwig & Caillis
ATTORNEY

United States Patent Office 3,025,720
Patented Mar. 20, 1962

3,025,720
HYDRODYNAMIC TORQUE CONVERTERS
Oliver Kenneth Kelley, Bloomfield Hills, Mich., assignor to General Motors Corporation, Detroit, Mich., a corporation of Delaware
Continuation of application Ser. No. 317,951, Oct. 31, 1952. This application Mar. 26, 1958, Ser. No. 724,204
8 Claims. (Cl. 74—677)

This is a continuation of application Serial No. 317,951, filed October 31, 1952, for Hydrodynamic Torque Converters, now abandoned, and relates to hydrodynamic torque converters and especially to such devices adapted to be used in the transmission of motor vehicles and in other installations wherein the particular properties thereof can be advantageously employed.

In my copending application S.N. 194,626, filed November 8, 1950, for Dual Range Plural Turbine Gear Drive, now Patent No. 2,766,641 issued October 16, 1956, I have disclosed a torque converter having a pump for circulating liquid through two turbines, one for starting the mechanism to be driven and the other for the principal driving thereof. The starting turbine is connected through gearing, such as a planetary reduction gear, to the output shaft of the transmission while the second turbine is connected to the output shaft through a part of the gearing for rotation with the output shaft. In addition to the two turbines, the said copending application discloses two reaction members and a secondary pump member. While the device just described possesses advantages over the prior art, it is susceptible to improvements, particularly in a simplification of the mechanical structure thereof.

Accordingly, an object of the present invention is to provide an improved torque converter having two turbines in which the construction mechanically is of the utmost simplicity.

Another object of the invention is to provide a converter, as just described, which possesses better torque multiplication and better efficiency for given speed ratios.

Other objects, features and advantages of the invention will become apparent by reference to the following detailed description of the accompanying drawings, wherein.

Figure 1:
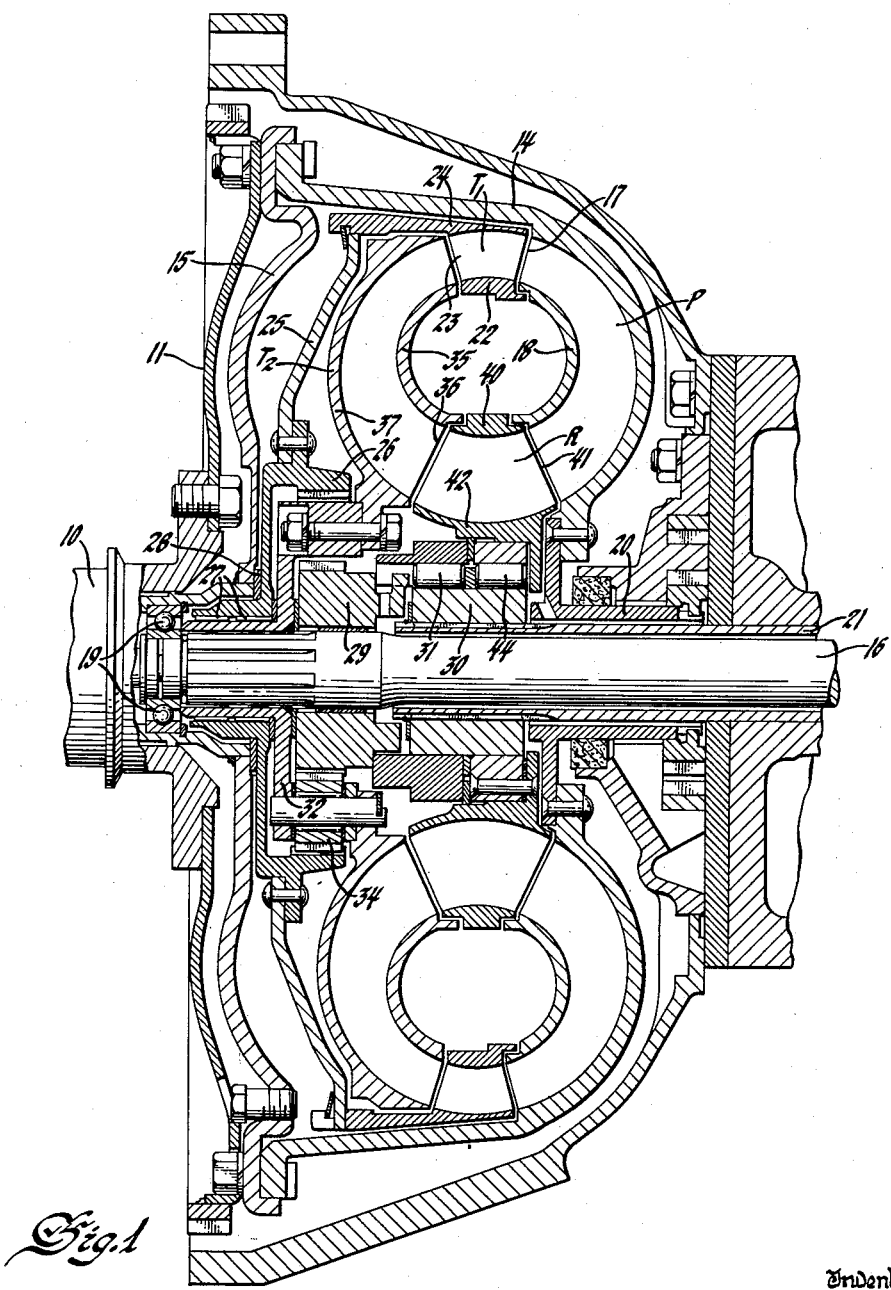
FIG. 1 is a longitudinal section of a form of my invention.

Referring now to the drawings and particularly to FIG. 1, 10 indicates the drive shaft of some prime mover such as an internal combustion engine, which drive shaft has connected thereto a flywheel construction 11, in turn connected to the multi-part casing 14 and 15 of a hydrodynamic torque converter which drives an output shaft 16 to actuate any desired load in any suitable fashion. In an automotive vehicle this drive shaft can either constitute the propeller shaft thereof or can be connected to drive the propeller shaft. The pump P of the converter is constructed in part of the arc shaped portion of the housing 14 and has attached thereto blades 17, to the inner edges of which are secured a core 18. The pump is supported for rotation relative to the output shaft 16 by extension 20, which can rotate about a stationary sleeve 21 surrounding part of output shaft 16. Radial bearings 19 between the flywheel and pump structure on the end of the drive shaft 16 permit relative rotation between these parts.

The first turbine T1 has a core 22, blades 23, and an outer casing or shroud 24 extended axially as shown. This shroud is connected by a member 25 to a ring gear 26 which is supported for rotation by roller bearings 27 and a thrust bearing 28. Ring gear 26 constitutes the driving member of a planetary reduction gear which has as the reaction member thereof a sun gear 29 rotatably supported on a part of output shaft 16 as shown. A one-way brake, which may be of any suitable type, is interposed between the stationary sleeve 30, splined to sleeve 21, and the sun gear 29, such brake being represented by the ratchet or locking rollers 31 which permit the gear to rotate in the direction of rotation of the pump and which lock the gear to the sleeve whenever the gear attempts to rotate in the opposite direcion. The other part of the reduction gearing comprises a planet carrier 32 having planets 34 mounted thereon in mesh both with the ring gear 26 and the sun gear 29. An angular annular extension of the carrier is splined directly to the output shaft as shown.

The second turbine T2 is made up of a core 35, blades 36, and an outer member or shroud 37 which is secured directly to the planet carrier 32, whereby the turbine T2 rotates concurrently with the output shaft 16.

The final converter member comprises a roto-stator or reaction member R made up of a core 40, blades 41, and an outer member or shroud 42, supported for rotation about the stationary sleeve 30 before mentioned. Use is also made of a suitable one-way brake exemplified by ratchet members or rollers 44 for permitting rotation of the member R in the direction of engine rotation but locking this member against opposite rotation.

The operation of the mechanism just described corresponds closely to that described in my copending application, before identified, in that rotation of the flywheel causes the pump of the converter to rotate therewith. Liquid circulated by the pump passes first through turbine T1 causing it to rotate, as the result of which the ring gear 36 revolves and applies a driving force to the carrier of the planetary gear system. The sun gear of this system is held stationary by the free-wheeling brake, before described, so that rotation of the ring gear causes the planets to walk around the stationary sun gear carrying the planet carrier therewith at a reduced rate relative to the speed of rotation of the ring gear. Since the planet carrier is connected directly to the turbine T2, this turbine must rotate therewith, even though liquid circulated by the pump may be applying negative torque to the second turbine. Rotation of the planet carrier of the second turbine causes rotation of the output shaft at a reduced rate of speed relative to the first turbine. As the speed of this first turbine increases, a point will be reached at which the first turbine no longer transmits torque but rotates idly about the planet carrier, causing the sun gear to free wheel or rotate therewith, at which time the second turbine has assumed the entire load.

The present invention distinguishes from the disclosure of my prior application to a large part in the configuration and angularity of the blades embodied or mounted in the various elements of the torque converter. For example, it has been found that for this particular type of torque converter improved results can be obtained by shaping the blades of the pump in such fashion that the angle of exit thereof is forward relative to a plane of reference passing through the axis of rotation of the pump. This forward angle may be varied within limits, but for purposes of illustration it may be assumed to be in the order of from 28° to 56°. The pump blades have their entrance ends inclined forwardly with respect to the direction of rotation of the impeller at an angle of from 0° to 20°. This angle is measured on the same basis as that previously described.

The first turbine T1 has the blades 23 thereof of airfoil shape with an entrance angle of from 0° to 30° backwards, and with an exit angle of from 45° to 70° backwards.

The second turbine T2 has the blades 36 thereof also of generally air-foil shape, with the blades so angularly disposed as to present an entrance angle of approximately 0° to 30° forward and an exit angle of from 0° to 50° backwards.

The reaction member R has the blades 41 thereof of shape closely corresponding to the shape of the blades of the first turbine but of a different angular disposition. In the reaction member the blades have an entrance angle of from 0° to 30° forward and a forward exit angle of from 40° to 72°.

Figure 2:
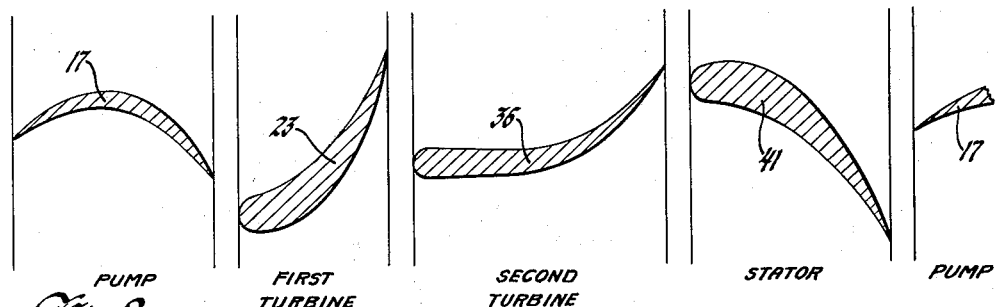
FIG. 2 is a schematic representation of particular blade forms and shapes which have proved satisfactory for the better operation of the device.

A diagrammatic representation of the various blades and their relative positions has been shown in FIG. 2, it being understood that the shape of the blades in each element falls within the range specified for that particular element. Due to the shape and angularity of the blades, the vector diagrams of FIGS. 3, 4, and 5 will serve to illustrate the characteristics of the present torque converter.

Figure 3:
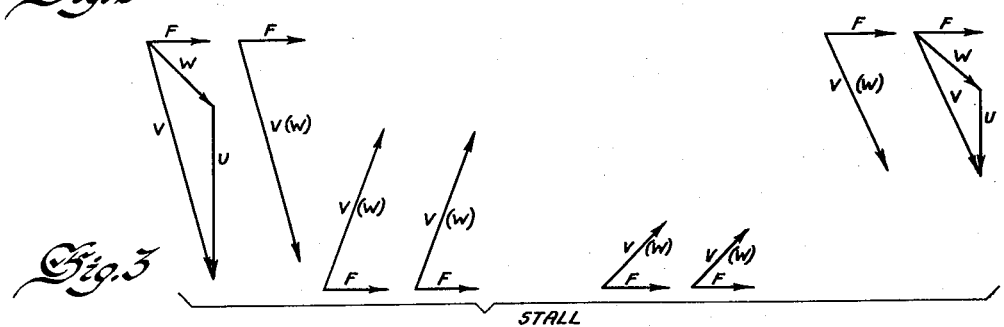
FIG. 3, 4 and 5 are typical vector diagrams for the operation of the converter in various phases of such operation.

Referring to FIG. 3, the vector diagrams represent the condition existing at stall, that is, with the pump rotating but with the other elements stationary. For the purpose of understanding these diagrams the following symbols are used for indicating the components of velocity of the circulating fluid:

$F$ = axial component of velocity
$W$ = relative velocity
$U$ = velocity of point on member
$V$ = absolute velocity Oil discharged from the pump has an axial component of velocity F, an indicated by the horizontal line so labeled. At the same time this oil has a relative velocity substantially tangential to the blade at an angle indicated by the line W. It also has a velocity in the direction of rotation of the pump coincidental with the velocity of movement of a point on a pump blade, as indicated by the line U. These components of velocity can be resolved into an absolute velocity with the angularity indicated by the line V.

The oil discharged from the pump with this absolute velocity enters the first turbine with an axial component substantially identical with the component of discharge from the pump but, since at stall the first turbine is stationary, the relative velocity and the absolute velocity are identical. The oil passes through the first turbine and is discharged therefrom with an axial component and with a change in direction so that the discharge is backwardly with identical relative and absolute velocities.

The oil continues from the first turbine into the second turbine with a flow having components of velocity similar of those of the discharge from the first turbine. In passing through the second turbine, however, the direction of flow and the velocity thereof are changed to such an extent that the oil leaving the second turbine has an axial component of velocity and relative velocity to the rear which coincides with the absolute velocity.

The oil discharged from the second turbine enters the reaction member, or stator, with the same components of velocity, as shown in the diagram but due to the change in angularity of the blades in this member relative to those of the second turbine the flow has its direction and velocity changed as shown again with an axial component F and identical relative and absolute velocities W and V. It will be noted that the direction of flow now is forwardly instead of backward as is true of the exit from the two turbines. The oil discharged from the stator enters the pump and, since the pump is moving, the components of velocity are changed, as shown, with the axial component F being maintained while a relative velocity W is again established along with a forward component of velocity U, determined by the rotation of the pump blades. These components can be resolved into the absolute velocity V of angularity permitting a gradual change as the oil progresses through the pump to again be discharged therefrom with the absolute velocity first mentioned.

As the speed of rotation of the pump is increased, the energy of the oil discharged therefrom will become of such magnitude that impingement upon, or contact with, the blades of the first turbine will cause this turbine to begin rotating. Rotation of the first turbine drives the ring gear 26 and in turn causes rotation of the planets of carrier 32 which is connected to the load, i.e., to the output shaft 16. The sun gear 29 is braked against rotation in a direction opposite to engine rotation and, consequently, it offers such reaction that the planets of the carrier must walk around the sun gear, carrying the carrier in the same direction of rotation as the ring gear, but at a reduced speed. Since the carrier is connected directly to the second turbine, the second turbine must rotate therewith, even though oil discharged from the first pump will enter the second turbine at such an angle and at such velocity as to attempt to establish negative torque in the second turbine. The angle of discharge of oil from the pump and the angularity of the blades of the first turbine are such that sufficient energy is expended in the first turbine as to overcome the negative torque in the second turbine and the resistance of the load to rotation. In fact, the energy expended in the first pump is sufficient to cause the output shaft to be rotated and to drive a vehicle in such manner that acceleration thereof can be accomplished in proportion to increase in engine speed, and hence pump speed. The torque delivered by the pump is multiplied by the first turbine with an overall exceedingly high efficiency, even though on the surface it would appear that the hydraulic efficiency of the first turbine would be low. Such hydraulic inefficiency is more than overcome by the expenditure of energy before mentioned and by the particular planetary gearing employed.

It is believed that a considerable part of the energy due to the velocity and mass of oil discharged by the pump is expended in actuating the first turbine so that a relatively smaller part of the inherent energy is available for establishing negative torque in the second turbine.

Figure 4:
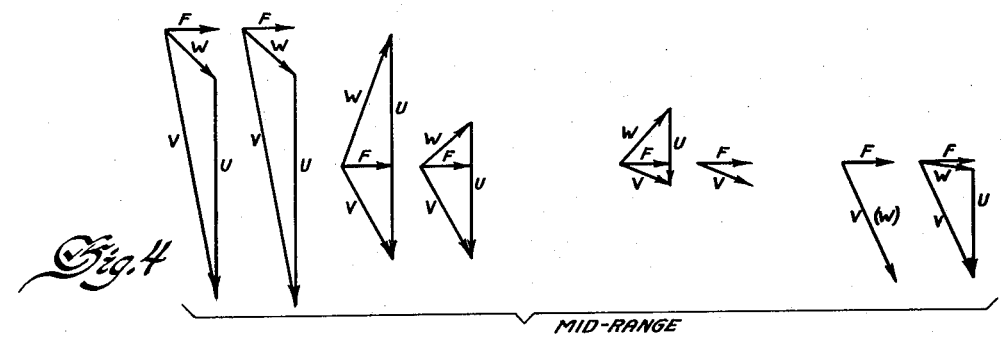

As the speed of the first turbine increases relative to the speed of the pump, the torque multiplication decreases and the speed of the second turbine likewise increases. This condition continues until at mid-range the speed of the first turbine approaches synchronism with the pump. In FIG. 4 vector diagrams showing the condition at mid-range operation have been presented. The same legends are applied to the lines indicating components of velocity as were employed in FIG. 3. Analyzing FIG. 4, it is apparent that, for a given axial velocity F, the oil will have a relative velocity W and an increased forward velocity component U greater than that of FIG. 3, since the pump is rotating at a higher rate. The discharged oil enters the first turbine which is rotating at a slightly lower rate than the pump, as indicated by the velocity of movement of a point on the first turbine blade, which line U is longer than the similar line of the pump. At this time the first turbine is still transmitting torque through the planetary gearing to the output shaft, and likewise the second turbine is also transmitting some torque through the gearing to the output shaft. This is due to the oil discharged from the first turbine now at a forward absolute velocity which is introduced into the second turbine. The oil discharged from the second turbine enters the reaction member which is still stationary, and it acts to return the oil to the inlet of the pump with a forward velocity.

The torque transmitted to the output shaft by the first turbine decreases as its speed of rotation increases, and at the same time the torque transmitted by the second turbine increases as its speed of rotation increases. Ultimately the first turbine attains a speed at which it transmits no torque and the full torque load is assumed by the second turbine. At this time the ring gear rotates idly about the carrier and, since there is no reactive force on the sun gear, it rotates with the carrier. The reaction member R is still stationary, hence multiplied torque is delivered to the drive shaft through the second turbine T2 and the carrier 32 rotating therewith. Such torque multiplication continues until the coupling point is reached at which time the relations shown by the vector diagrams of FIG. 5 arise.

Figure 5:
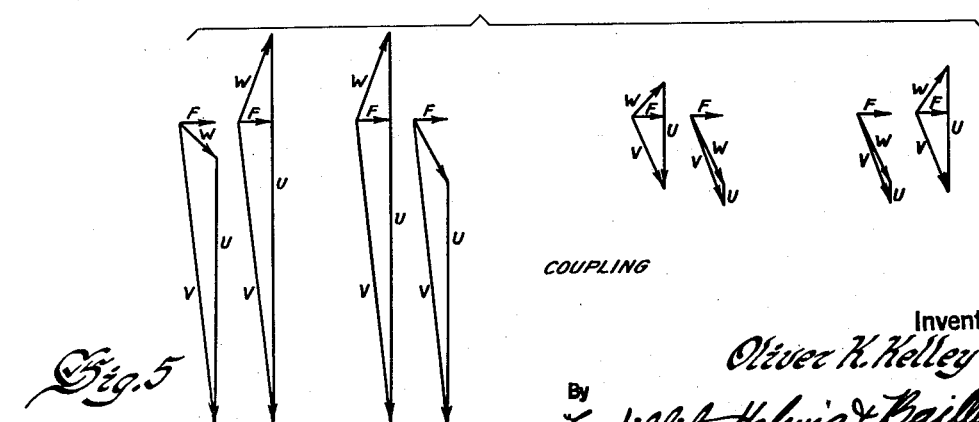

As operation continues, the first turbine will be accelerated to a speed exceeding that of the pump, which condition is graphically illustrated in FIG. 5. Oil discharged by the pump has a higher velocity in the direction of rotation and, consequently, a sharper absolute velocity in relation to a given axial component of velocity. When oil enters the first turbine, which is now rotating at a faster rate than the pump, it has a travel through the pump over a longer path, as shown by the lines U, both at entry and at discharge. Therefore, it may be said that the oil discharged from the pump passes through the first turbine with its forward angle velocity substantially unchanged, and enters the second turbine at substantially the same absolute velocity as its discharge. Naturally, the first turbine is transmitting no torque and is consuming a relatively negligible amount of the energy of the oil discharged.

The oil entering the second turbine, as before stated, has substantially the same absolute velocity as the pump discharge for a given axial component of velocity, but has a different angle of relative velocity and a different velocity in the direction of rotation, as is shown. This is due to the fact that the second turbine, in consuming energy from the oil, cannot attain the same speed of rotation as the pump.

In this condition of operation the second turbine is transmitting substantially full torque with no torque being transmitted by the first turbine. It follows that such action by the second turbine imparts drive to the output shaft, and there is no reaction applied to the sun gear which is now free to rotate along with the carrier driven by the second turbine. The first turbine and the ring gear driven thereby can rotate about the carrier without establishing reaction in the sun gear, so long as the speed of the ring gear does not exceed the speed of the carrier in amount sufficient to tend to move the sun gear in a direction opposite to the engine rotation.

The oil leaving the second turbine in this phase of operation has a very small relative velocity in a backward direction, but does have an absolute velocity in a forward direction which will cause the reaction member to rotate with the second turbine, a condition possible by the provision of the free-wheel brake in the mounting of the reaction member. At this time the converter is performing as a fluid coupling.

Figure 6:
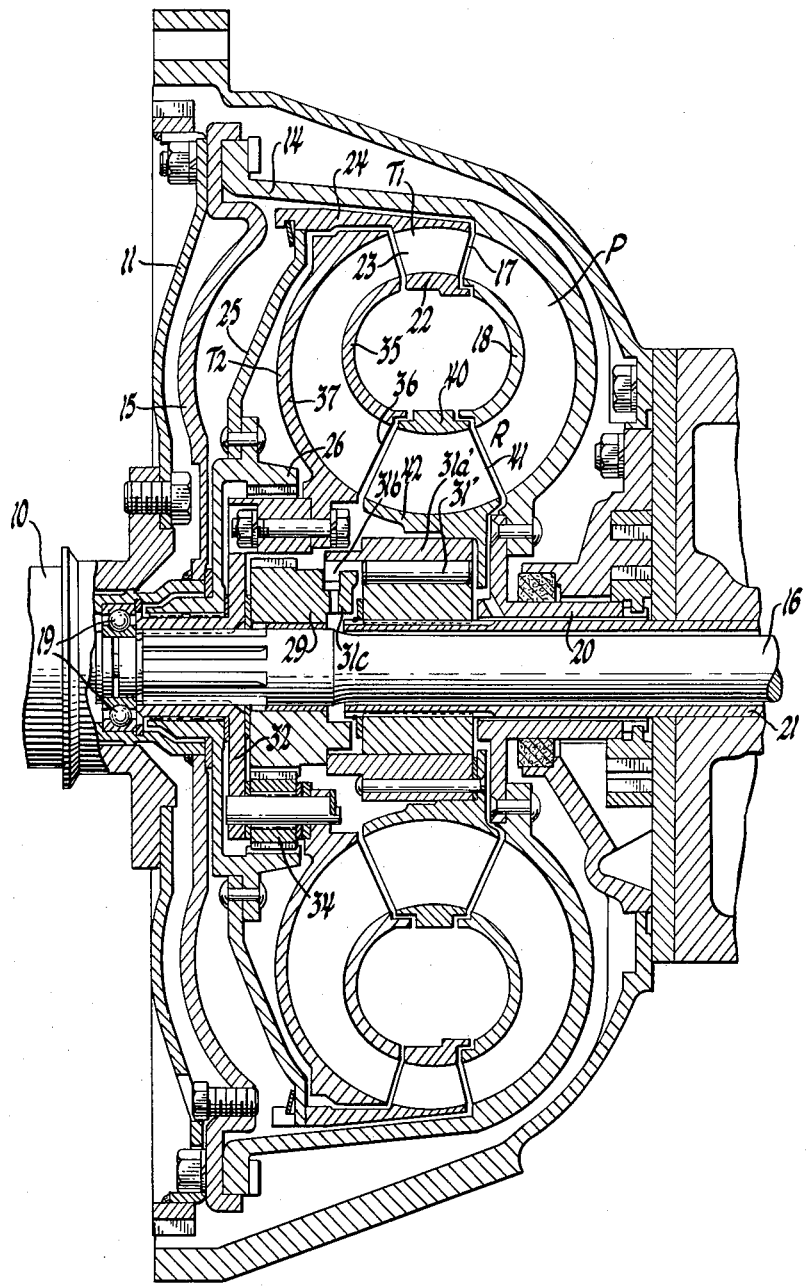
FIG. 6 is a section corresponding to FIG. 1 showing a modified form.

If desired, the blade shapes and angles of the various converter elements can be such that the sun gear and the reaction member begin free wheeling coincidently, and therefore these two parts of the mechanism may be permanently joined with a single free-wheel brake employed instead of separate brake, as shown in FIG. 6. In this modification the single one-way brake having rollers 31' and outer race 31a' replaces the two brakes having two sets of rollers 31 and 44 of FIG. 1, otherwise the structure corresponds to that of FIG. 1 as shown by identical reference characters where they occur in the two views. The vector diagram shown in FIG. 5 shows the condition in the modification of FIG. 6 at the moment the sun gear and reaction member begin to rotate, which necessarily is in unison.

The coupling condition will continue so long as there is no demand for torque multiplication but, should such demand occur, the increase in torque required to meet the demand will be obtained either by the second turbine T2 supplying the same, in which event the reaction member R will become braked to the stationary sleeve 30; or, if the demand is of a very high nature, then the first turbine T1 will have its speed reduced relative to the pump P and will also again transmit torque through the reduction gearing to meet the requirement.

From the foregoing it will be seen that the present invention provides a torque converter employing two turbines T1 and T2, the first of which transmits high starting torque to the output shaft and the second T2 of which assumes transmission of torque as that transmitted by the first turbine T1 decreases. The extremely high starting torque transmitted by the first turbine T1 may be attributed to the shape of the pump blades 17 and also to the shape of the blades 23 of the first turbine T1. As pointed out previously, the pump P has a considerable exit angle forwardly directed, so that the liquid discharged from the pump has an absolute velocity in a forward direction and at a steep angle relative to a reference plane passing through the axis of the converter. It will be noted that the first turbine T1 is so shaped as to have its blades 23 inclined generally backwardly so that the liquid discharged from the pump impact with the blades of the first turbine.

It is to be understood that the invention can be modified beyond the illustrated embodiment and, accordingly, any limitations imposed and shown are to be only those set forth in the following claims.

What is claimed is:

1. A hydrodynamic torque converter comprising in combination a pump for circulating liquid, means for rotating said pump, a first turbine and a second turbine rotatable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine with the inclination of the blades of said second turbine being substantially less than the inclination of the blades of the said first turbine, reactor means for said torque converter, said planetary gear unit including a ring gear driving member connected to said first turbine, a sun gear, planet pinions rotatably mounted on a carrier connected to said second turbine and said output shaft, said planet pinions meshing with said ring and sun gears, brake means for preventing reverse rotation of said reactor means, other brake means for preventing reverse rotation of said sun gear, and a spline connection between said other brake means and said sun gear.

2. A hydrodynamic torque converter comprising in combination a pump for circulating liquid, means for rotating said pump, a first turbine and a second turbine rotable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine with the inclination of the blades of said second turbine being substantially less than the inclination of the blades of the said first turbine, reactor means for said torque converter, said planetary gear unit including a driving ring gear connected to said first turbine, a sun gear, planet pinions rotatably mounted on a carrier connected to said second turbine and said output shaft, said planet pinions meshing with said ring and sun gears, means for preventing reverse rotation of said reactor means, and a spline connection between said means for preventing reverse rotation of the reactor means and said sun gear for preventing reverse rotation of the sun gear.

3. A hydrodynamic torque converter comprising in combination a pump for circulating liquid, means for rotating said pump, a first turbine and a second turbine rotatable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine with the inclination of the blades of said second turbine being substantially less than the inclination of the blades of the said first turbine, a reaction member for said torque converter, said planetary gear unit including a driving ring gear connected to said first turbine, a sun gear, planet pinions rotatably mounted on a carrier connected to said second turbine and said output shaft, said planet pinions meshing with said ring and sun gears, and a single one-way brake for preventing reverse rotation of the reaction member and the sun gear.

4. A hydrodynamic torque converter comprising in combination a pump for circulating liquid, means for rotating said pump, a first turbine and a second turbine rotatable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine with the inclination of the blades of said second turbine being substantially less than the inclination of the blades of the said first turbine, a reactor for said torque converter, said planetary gear unit including a driving ring gear connected to said first turbine, a sun gear, planet pinions rotatably mounted on a carrier connected to said second turbine and said output shaft, said planet pinions meshing with said ring and sun gears, a one-way brake having a member secured to the reactor and adapted to rotate only in the sense of rotation of the pump, and intermeshing splines and spline grooves on the sun gear and on said member to prevent reverse rotation of the sun gear.

5. A hydrodynamic torque converter comprising in combination a pump for circulating liquid, means for rotating said pump, a first turbine and a second turbine rotatable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined at predetermined inclination in a range between minimum and maximum inclination that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine at predetermined inclination in a range between minimum and maximum inclination, the maximum inclination of the range for the blades of said first turbine being substantially greater than the maximum inclination of the range for the blades of said second turbine, reactor means for said torque converter, said planetary gear unit including a ring gear driving member connected to said first turbine, a sun gear, planet pinions rotatably mounted on a carrier connected to said second turbine and said output shaft, said planet pinions meshing with said ring and sun gears, brake means for preventing reverse rotation of said reactor means, other brake means for preventing reverse rotation of said sun gear, and a spline connection between said other brake means and said sun gear.

6. A hydrodynamic torque converter comprising in combination a pump for circulating liquid, means for rotating said pump, a first turbine and a second turbine rotatable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined at predetermined inclination in a range between minimum and maximum inclination that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine at predetermined inclination in a range between minimum and maximum inclination, the maximum inclination of the range for the blades of said first turbine being substantially greater than the maximum inclination of the range for the blades of said second turbine, reactor means for said torque converter, said planetary gear unit including a driving ring gear connected to said first turbine, a sun gear, planet pinions rotatably mounted on a carrier connected to said second turbine and said output shaft, said planet pinions meshing with said ring and sun gears, means for preventing reverse rotation of said reactor means, and a spline connection between said means for preventing reverse rotation of the reactor means and said sun gear for preventing reverse rotation of the sun gear.

7. A hydrodynamic torque converter comprising in combination a pump for circulating liquid, means for rotating said pump, a first turbine and a second turbine rotatable by the liquid circulated by said pump, said pump circulating liquid in a circuit having radial flow zones and aixal flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined at predetermined inclination in a range between minimum and maximum inclination that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine at predetermined inclination in a range between minimum and maximum inclination, the maximum inclination of the range for the blades of said first turbine being substantially greater than the maximum inclination of the range for the blades of said second turbine, a reaction member for said torque converter, said planetary gear unit including a driving ring gear connected to said first turbine, a sun gear, planet pinions rotatably mounted on a carrier connected to said second turbine and said output shaft, said planet pinions meshing with said ring and sun gears, and a single one-way brake for preventing reverse rotation of the reaction member and the sun gear.

8. A hydrodynamic torque converter comprising in combination a pump for circulating liquid, means for rotating said pump, a first turbine and a second turbine rotatable by the liquid circulated by said pump, said pump circulating liquid in a circuit having radial flow zones and axial flow zones, said first turbine being located substantially entirely in an axial flow zone, an output shaft, means including a planetary reduction gear unit for establishing a driving connection between said first turbine and said shaft, said first turbine being connected to the driving member of said unit, said second turbine being connected to the driven member of said unit and to said shaft for rotation therewith, said pump having the blades thereof so shaped and inclined as to discharge liquid forwardly and at a considerable angle relative to the axis of the converter, said first turbine having its blades so shaped and inclined at predetermined inclination in a range between minimum and maximum inclination that liquid discharged by said pump contacts said turbine blades with high impact to cause said first turbine to transmit high starting torque through the driven member of said unit to said shaft, and to overcome any negative torque developed by liquid passing through said second turbine, said second turbine having its blades inclined in the same direction as the blades of said first turbine at predetermined inclination in a range between minimum and maximum inclination, the maximum inclination of the range for the blades of said first turbine being substantially greater than the maximum inclination of the range for the blades of said second turbine, a reactor for said torque converter, said planetary gear unit including a driving ring gear connected to said first turbine, a sun gear, planet pinions rotatably mounted on a carrier connected to said second turbine and said output shaft, said planet pinions meshing with said ring and sun gears, a one-way brake having a member secured to the reactor and adapted to rotate only in the sense of rotation of the pump, and intermeshing splines and spline grooves on the sun gear and on said member to prevent reverse rotation of the sun gear.

References Cited in the file of this patent

UNITED STATES PATENTS

| | | |
|---|---|---|
| 2,293,358 | Pollard | Aug. 18, 1942 |
| 2,382,088 | Moffit | Aug. 14, 1945 |
| 2,616,309 | Russell | Nov. 4, 1952 |
| 2,624,215 | McRae | Jan. 6, 1953 |